Figure 1:
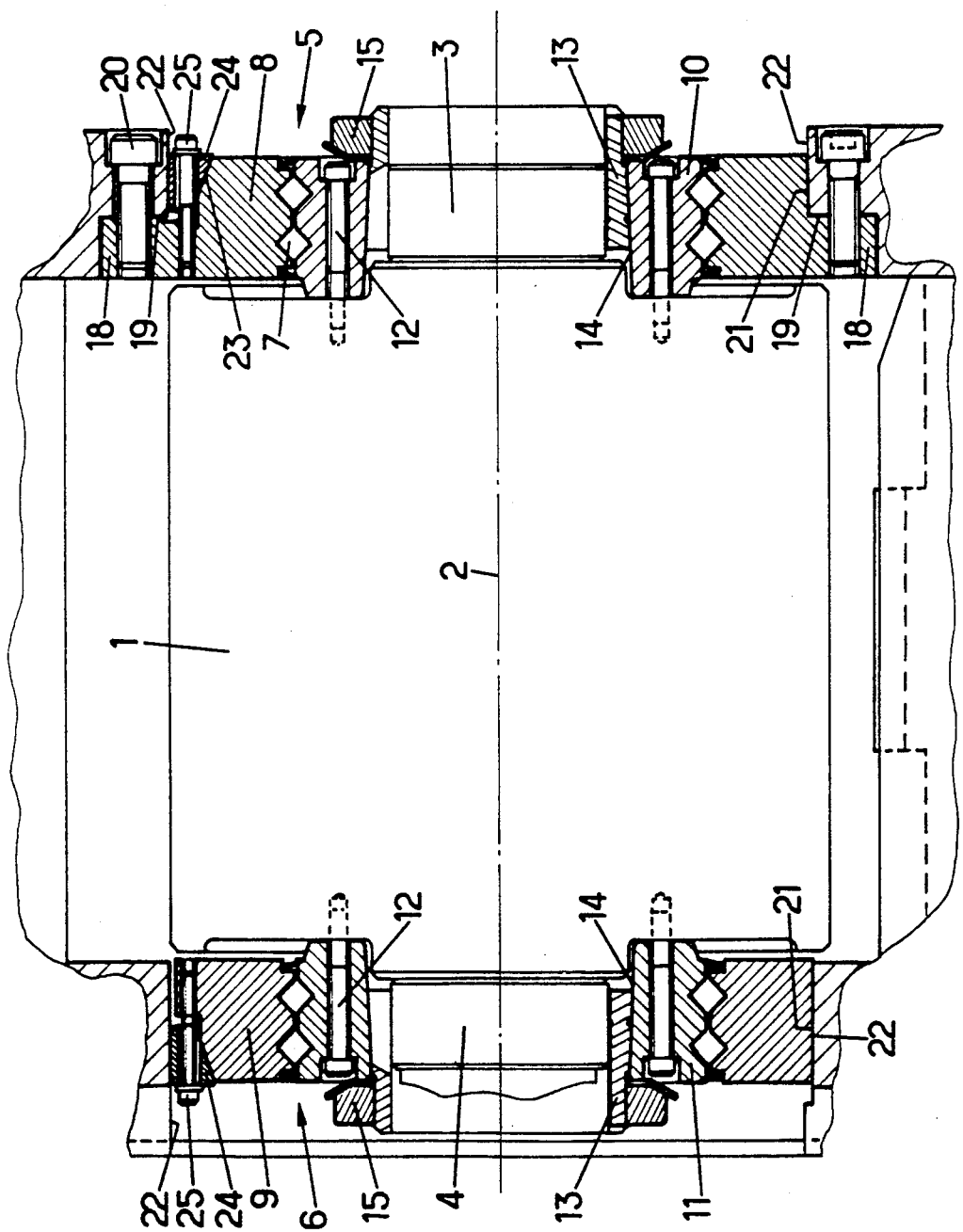

United States Patent [19]

Nicolas et al.

[11] Patent Number: 5,174,661
[45] Date of Patent: Dec. 29, 1992

[54] DEVICE FOR MOUNTING A ROTATING PART BETWEEN TWO BEARINGS WITHOUT PLAY

[75] Inventors: Michel Nicolas, Tanlay; Pierre Bourgeois-Jacquet, Avallon, both of France

[73] Assignee: R.K.S., Avallon, France

[21] Appl. No.: 810,343

[22] Filed: Dec. 17, 1991

Related U.S. Application Data

[63] Continuation of Ser. No. 475,828, Feb. 6, 1990, abandoned.

[30] Foreign Application Priority Data

Feb. 14, 1989 [FR] France .................. 89 01882

[51] Int. Cl.⁵ ............................. F16C 43/04
[52] U.S. Cl. ......................... 384/538; 384/542; 384/585
[58] Field of Search ............ 384/447, 519, 537-542, 384/559, 560, 562, 569, 570, 584, 585, 617, 618, 620

[56] References Cited

U.S. PATENT DOCUMENTS

| | | | |
|---|---|---|---|
| 1,699,330 | 1/1929 | Gayman | 384/584 |
| 1,754,077 | 4/1930 | Blume | 384/583 |
| 2,033,156 | 3/1936 | Shafer | 384/584 |
| 2,045,896 | 6/1936 | Brusca | 384/540 |
| 2,147,787 | 2/1939 | Ferguson | 384/540 |
| 2,650,867 | 9/1953 | Spieth | 384/540 |
| 3,261,262 | 7/1966 | Hilfing et al. | 384/538 |
| 3,806,215 | 4/1974 | Price et al. | 384/538 |

FOREIGN PATENT DOCUMENTS 2190197 1/1974 France .

Primary Examiner—Thomas R. Hannon
Attorney, Agent, or Firm—Beveridge, DeGrandi, Weilacher & Young

[57] ABSTRACT

A method and apparatus for mounting a rotating part between two bearings designed to transmit radial and axial forces without axial and radial play. Each bearing includes a rolling element positioned between an outer part and an inner race surrounding the shaft end. Each bearing also includes a conical sleeve in contact with an inclined surface of the inner race. A nut is threaded to the outer end of the conical sleeve such that rotation of the nut causes the centering of the shaft end within the bearing. The outer part includes a chamfer surface into which extends a shim. A screw is rotted to cause the shim to compress the outer part downwardly toward the inner race. The method for mounting the rotating part also includes the use of a stepped shoulder at one end of the housing to prevent axial movement of one of the bearing members. The opposite end of the housing does not include a stepped shoulder so as to allow easy insertion of the second bearing member.

7 Claims, 2 Drawing Sheets

DEVICE FOR MOUNTING A ROTATING PART BETWEEN TWO BEARINGS WITHOUT PLAY

This application is a continuation of application No. 07/475,828, filed Feb. 6, 1990, now abandoned The invention relates to the mounting of a rotating or oscillating part comprising two shaft ends which are to be journalled in two bearings, without radial or axial play, and have to accept loads in all directions.

The conventional solution consists in supporting the shaft or the two shaft ends by means of two radial rolling bearings which support the radial loads, and two axial thrust bearings which support the axial loads. The races of the radial rolling bearings are fitted onto the shaft and into the bore of the support, one of the races being mounted tightly and the other with play in order to cancel out the axial stresses.

The assembly therefore has necessarily radial play owing, on the one hand, to the fitting of the rolling bearing and, on the other hand, to its internal play.

Moreover, in order to obtain correct mounting of the rolling bearings, it is necessary to machine the bearing surfaces with great precision, generally grade six for the shaft and grade seven for the bore, which is not always easy.

One possible solution for reducing this play is to produce a tight fit on each of the races of the rolling bearing, but correct mounting requires even smaller manufacturing tolerances than previously.

Furthermore, the thrust bearings necessary for supporting the axial loads are locked between two shoulders. In order to produce an assembly without axial play, it is therefore necessary to adjust the relative position of the shoulders properly, which can be done only to the final assembly. Consequently, this requires at least one assembly, disassembly and reassembly including setting the thickness of the cover, for example by adding shims. Each assembly produced is therefore special and there is no interchangeability from one to the other.

The object of the invention is to eliminate the above disadvantages, that is to say to produce an assembly which is simpler, does not require extreme precision and is easier to mount, while supporting the loads in all directions without axial or radial play.

According to the invention, each bearing comprises exclusively a rolling bearing of the type with axial and radial transmission of the forces and tight fitting of the rolling elements between an outer element and an inner race.

The outer element of each rolling bearing comprises a means for radially locking the element in a housing, ensuring at the same time the axial locking of this element in this housing, at least for one of the bearings, and the inner race of each rolling bearing is mounted on one of the shaft ends of the rotating part via a locking means ensuring simultaneously the radial centering of the race on the shaft end and the preloading of the rolling bearing, these various locking means being locked in position after the mounting of the rotating part.

The device for implementing the method according to the invention therefore comprises, in addition to the two bearings with axial and radial transmission of the forces, the locking means of both types, axial and radial, which are both arranged so as to be able to be actuated from outside once the assembly has been constructed.

Figure 2:
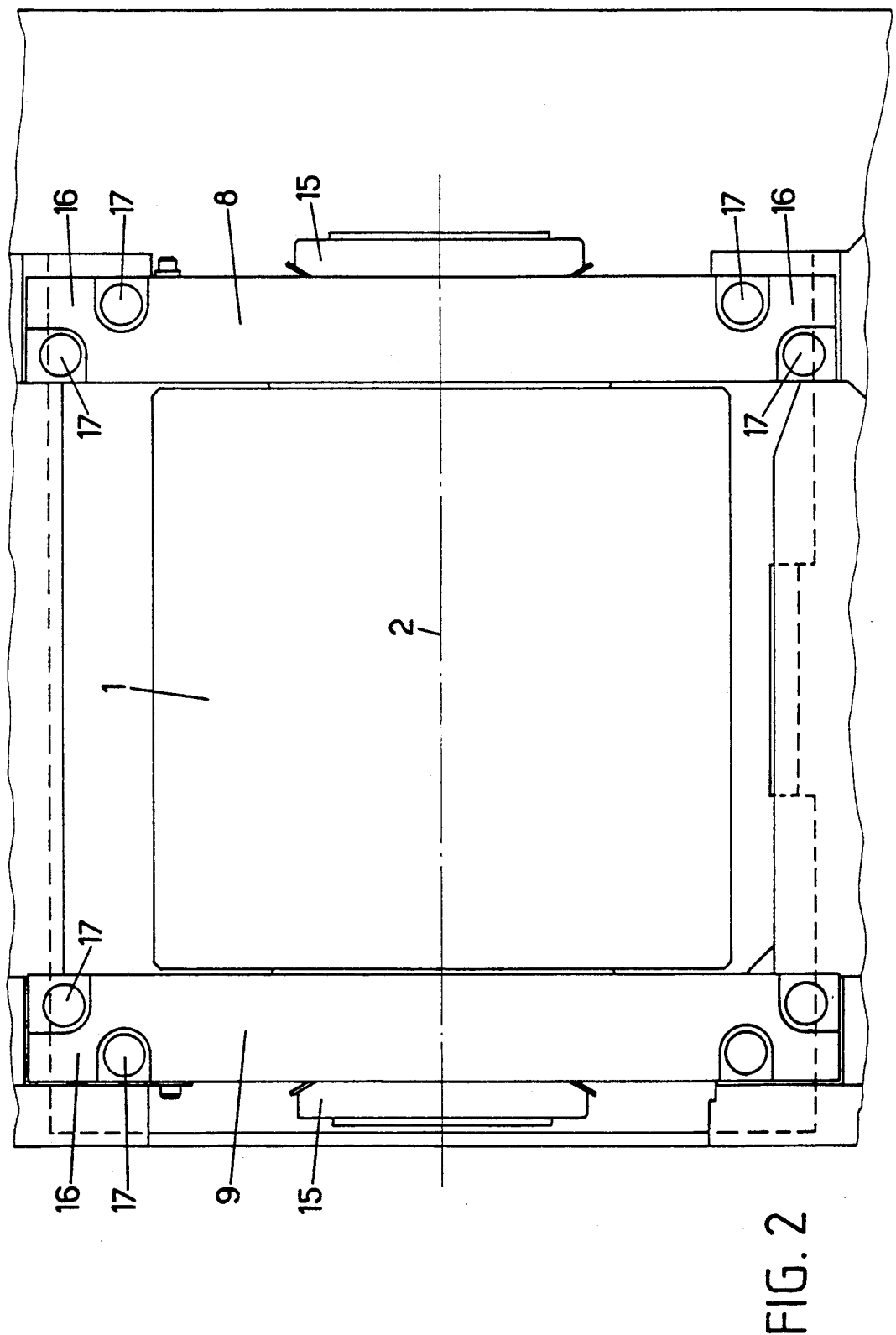

Other features of the invention will emerge in the description which follows of an embodiment taken as an example and shown in the accompanying drawing, in which:

FIG. 1 is a partial axial section of the assembly; and
FIG. 2 is an elevational view of that which is shown in section in FIG. 1 with portions of the housing removed for clarity.

The figures show the rotating part 1 which has to be able to rotate about an axis 2, embodied by two shaft ends 3 and 4, either in complete revolutions or with simple oscillating motion, and this without radial or axial play, while being able to support large loads in all directions.

Each of the bearings 5 and 6, receiving the shaft ends 3 and 4 respectively, consists exclusively of a rolling bearing with axial and radial transmission of the forces. In the example shown, the rolling bearings have two rows of crossed rollers 7 arranged between an outer part 8 or 9, of substantially square external configuration, and an inner revolving race 10 or 11. However, these bearings could be of any other type, provided that they are capable of supporting radial and axial loads.

The interior race 10 of the bearing 5 is mounted against the rotating part 1 by means of a series of screws 12 taking up any axial play, and also on the shaft end 3 via a split conical sleeve 13, of known type, comprising a cylindrical inner surface which is mounted on the shaft end 3 and a conical outer surface, for example of slope 1/12, which is mounted in the conical inner bore 14, of the same slope, with which the interior race 10 is provided.

According to the invention, the concentric nut 15, which permits locking of the conical sleeve 13 by axial displacement, is arranged so as to be able to be actuated, as are the screws 12, directly from outside the assembly.

This actuation of the nut 15, by means of an appropriate tool, including for example a hydraulic tightener, makes it possible, by expansion of the interior race 10:
- to take up the internal play of the rolling bearing, that is to say the play between the crossed rollers and the two race ways of the outer part 8 and the inner race 10 respectively,
- to center the race 10 on the shaft end 3, which is customary with this type of conical sleeve, and
- to accept large tolerances of the shaft end 3.

The interior race 11 of the bearing 6 is identical to the race 10 and is mounted on the shaft end 4 in exactly the same way.

As shown in FIG. 2, the outer part 8 of the bearing 5 comprises, in its two corners situated in front of the plane of FIG. 1, transverse stop projections 16 intended to come to bear and be fastened by means of screws 17 on appropriate shoulders of the bearing housing in which this component is mounted.

In addition, this same outer part 8 comprises, along two opposite sides, transverse edges 18 intended to come to bear on axial shoulders 19 with which the housing corresponding to the bearing 5 is provided, under the influence of axial locking screws 20 distributed along the two corresponding sides of this outer part 8.

Furthermore, along one of its edges, preferably the lower edge, is a radial shoulder 21 which comes to bear on a corresponding plane face 22 of the housing of the bearing 5.

In contrast, on the opposite edge, the radial shoulder 21 is replaced by a gently sloping chamfer situated set back from the plane face 22 corresponding to this edge so as to make room for a prismatic shim 24 of trapezoidal cross-section, with a slope corresponding to that of the chamfer 23, and which can be locked by means of axial locking screws 25 which are screwed into the outer part 8.

The tightening of the screws 17, 20 and 25, which are all accessible from outside, makes it possible to arrest and take up all the axial and radial play of the outer part 8 of the bearing 5.

The bearing 6 is designed in the same manner as the bearing 5, except that it is without transverse edges 18, which enables it, before locking, to slide axially on the plane face 22 via its radial shoulder 21 which extends over the entire thickness of the part 9, whereas, in contrast, the locking of the trapezoidal shim 24 by the screws 25 produces not only radial locking as before but also axial locking by action on the other plane face 22.

Consequently, the entire assembly according to the invention employs only a small number of components which can be produced without the need for stringent tolerances, and which are thereby interchangeable.

After putting together these various components, it is sufficient to ensure the axial and radial locking of the inner races 10 and 11 by tightening the screws 12 and the nuts 15, and also the locking of the screws 20 on one side and the screws 25 on both sides, in order to ensure both the immobilization in position of all the elements and elimination of any play, including the internal play of the rolling bearings.

The absence of any final adjustment permits not only rapid, economical and reliable assembly, but also ensures interchangeability of the components in order to facilitate maintenance or repairs.

We claim:

1. A device for rotatably mounting a rotating part in a housing, said rotating part having two opposite shaft ends, comprising:
    a first bearing located between a first of said two shaft ends and the housing, said first bearing comprising a first inner race member, a first outer race member surrounding said first inner race member, and first rolling elements positioned between said first inner race member and said first outer race member such as to transmit axial and radial forces between said first inner and outer race members;
    a second bearing located between the second of said two shaft ends and the housing, said second bearing comprising a second inner race member, a second outer race member surrounding said second inner race member, and second rolling elements positioned between said second inner race member and said second outer race member such as to transmit axial forces between said second inner and outer race members;
    first locking means for axially securing said first inner race member directly to said rotating part and around said first shaft end;
    second locking means for axially securing said second inner race member directly to said rotating part and around said second shaft end;
    third locking means for radially centering said first inner race member on said first shaft end;
    fourth locking means for radially centering said second inner race member on said second shaft end;
    fifth locking means for axially securing said first outer race member to said housing;
    sixth locking means for radially locking said first outer race member to said housing; and
    seventh locking means for simultaneously axially and radially locking said second outer race member to said housing;
    whereby all said locking means are actuatable after mounting of the rotating part in the housing.

2. The device of claim 1, wherein said first locking means includes axial screws.

3. The device of claim 1, wherein said second locking means includes axial screws.

4. The device of claim 1, wherein said third locking means includes a split sleeve between said first inner race member and said first shaft end, said split sleeve having a conical outer surface, said first inner race member having a corresponding conical inner surface, said split sleeve further having a threaded exterior, and a nut with a threaded interior being in threaded engagement with said split sleeve such that upon tightening of said nut, said split sleeve is axially displaced between said first inner race member and said first shaft end.

5. The device of claim 1, wherein said fourth locking member includes a split sleeve between said second inner race member and said second shaft end, said split sleeve having a conical outer surface, said second inner race member having a corresponding conical inner surface, said split sleeve further having a threaded exterior, and a nut with a threaded interior being in threaded engagement with said split sleeve such that upon tightening of said nut, said split sleeve is axially displaced between said second inner race member and said second shaft end.

6. The device of claim 1, wherein said first outer race member has a substantially square-shaped external configuration and comprises two axial shoulders respectively on two opposite sides thereof, said housing receiving said first outer race member comprises two corresponding opposite axial shoulders, and said fifth locking means comprises axial screws for axially clamping said shoulders of said first outer race member against said shoulders of said housing, said first outer race member further comprising two radial shoulders on said two opposite sides thereof, respectively, one of said radial shoulders having a chamfer, and said sixth locking means comprises a prismatic shim located between said chamfer and the corresponding radial shoulder of the housing, and axial screws extending through said shim and in threaded engagement with said first outer race member such that, when tightened, said screws force said shim further between said chamfer and said corresponding radial shoulder of the housing.

7. The device of claim 1, wherein said second outer race member had a substantially square-shaped external configuration and comprises two radial shoulders on two opposite sides thereof, respectively, one of said shoulders having a chamfer, and said seventh locking means comprises a prismatic shim located between said chamfer and the corresponding radial shoulder of the housing, and axial screws extending through said shim and in threaded engagement with said second outer race member such that when tightened, said screws force said shim further between said chamfer and said corresponding radial shoulder of the housing.

* * * * *